(12) United States Patent
Bandera et al.

(10) Patent No.: US 6,223,252 B1
(45) Date of Patent: Apr. 24, 2001

(54) HOT SPARE LIGHT WEIGHT MIRROR FOR RAID SYSTEM

(75) Inventors: Daniel Quinto Bandera, Austin; Dale Arthur Legband, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/072,259

(22) Filed: May 4, 1998

(51) Int. Cl.[7] ............................................. G06F 12/16
(52) U.S. Cl. ........................... 711/114; 711/162; 711/112
(58) Field of Search ........................... 711/112, 114, 711/162; 395/181, 182.04; 371/31, 40.15, 48

(56) References Cited

U.S. PATENT DOCUMENTS

| | | | | |
|---|---|---|---|---|
| 5,321,826 | * | 6/1994 | Ushiro | 711/162 |
| 5,611,069 | * | 3/1997 | Matoba | 711/114 |
| 5,666,538 | * | 9/1997 | DeNicola | 713/320 |
| 5,681,499 | * | 10/1997 | Benson et al. | 222/606 |
| 5,732,238 | * | 3/1998 | Sarkozy | 711/135 |
| 5,751,997 | * | 5/1998 | Kullick et al. | 711/162 |

* cited by examiner

Primary Examiner—B. James Peikari
Assistant Examiner—Matthew D. Anderson
(74) Attorney, Agent, or Firm—Volel Emile; Felsman, Bradley, Vaden, Gunter & Dillon, LLP

(57) ABSTRACT

A hot spare drive within a disk array mirrors writes to a selected drive within the disk array. The mirror is light weight in that little effect on system performance is seen, since both writes need not be complete before the write is returned as successful. Upon subsequent failure of a drive within the array, the need for data regeneration is reduced or eliminated if the failed drive is the mirrored drive. The hot spare remains available for failure recovery when a different drive (other than the mirrored drive) fails, in which case conventional data regeneration techniques may be employed. When the mirrored drive fails, however, the period during which the disk array operates with diminished performance is reduced since data from the failed drive is available on the hot spare and regeneration is only required for data not completely mirrored. Even when a drive is arbitrarily selected within the array for mirroring, an overall reduction in the time required for data regeneration of failed disks will be seen in systems employing large numbers of arrays. Error information relating to the disk drives within the drive array and/or predictive failure analysis may be employed to increase the probability that the failed drive was mirrored. The prospect of complete data loss due to multiple drive failure is also reduced, since multiple drive failure is not fatal if one of the failed drives was mirrored.

20 Claims, 3 Drawing Sheets

HOT SPARE LIGHT WEIGHT MIRROR FOR RAID SYSTEM

BACKGROUND OF THE INVENTION

1. Technical Field

The present invention relates in general to disk arrays and in particular to failure recovery in disk arrays. Still more particularly, the present invention relates to speeding data regeneration during failure recovery in disk arrays.

2. Description of the Related Art

Data processing systems typically store critical programs and data on magnetic disk drives for use during data processing. Often the magnetic disk drives are large and only one drive is attached to the data processing system. However, multiple disk drives may be employed to provide a more reliable and flexible data storage subsystem. In data processing systems that require reliable access to the data storage, multiple disk drives are utilized primarily to provide failure recovery capabilities for primary storage drives. Additionally, the storage capacity and performance of data processing systems may be increased by employing multiple, smaller form-factor drives instead of a single, large drive.

Storage subsystems with multiple drives may comprise a group of disk drives with no particular arrangement or configuration, or a disk array including a specific controller and a particular data storage scheme. Disk arrays, also referred to as Redundant Array of Independent Disk ("RAID") devices, are utilized with data processing systems to increase data availability and storage capacity, to provide performance flexibility, and to increase data protection. RAID devices include special controllers which permit all of the drives within the RAID subsystem to appear as a single storage device to the host data processing system.

Performance of the data transactions to RAID storage devices may be enhanced by spreading segments of data over the multiple drives and then allowing the drives to operate on a request simultaneously. Thus, RAID drive groups often write data in "stripes" (a continuous data parcel written in segments to multiple drives) to improve performance by mapping contiguous data across multiple physical drives. For example, when a data processing system requests four contiguous data segments from a five drive RAID drive-group which supports data striping, the four data segments may actually be written to four different physical drives. The data, resident on four different drives, may be retrieved in a parallel operation, which increases access and speed between the data processing system and the RAID device. Such physical mapping of data, also referred to as data striping, is supported by most RAID classes, including RAID 0, 0+1, 5 and 6.

As the number of drives on a system increases, the likelihood of a drive failing increases. Data mirroring, creating exact copies of data on multiple disks, increases data safety of the data but may significantly reduce the storage capacity of the disk array. Thus, various encoding schemes are generally utilized to reduce the redundancy required for data protection. In RAID drive groups, such encoding typically involves storing computed parity for data segments in the disk array. Typically one or more disks within the drive group is designated as a parity drive containing such computed parity.

When a disk forming part of a RAID device employing parity-based data protection fails, data from that failed disk must be regenerated utilizing parity from the remaining devices and written to a new, replacement disk. Many RAID systems support a "hot spare" disk drive within the drive group for the purpose of holding regenerated data until the failed disk drive is replaced. The problem is that during the data regeneration (or "rebuilding") phase, the performance delivered from the RAID drive array is reduced. Furthermore, failure of another disk drive within the drive array while the data is being regenerated results in complete loss of data.

It would be desirable, therefore, to provide a mechanism for reducing a period of decreased performance of a disk array during a data regeneration phase. It would further be advantageous to improve the performance of a data regeneration phase after a disk failure.

SUMMARY OF THE INVENTION

It is therefore one object of the present invention to provide an improved disk array system.

It is another object of the present invention to provide an improved method and apparatus for failure recovery in disk arrays.

It is yet another object of the present invention to provide a method and apparatus for speeding data regeneration during failure recovery is disk arrays.

The foregoing objects are achieved as is now described. A hot spare drive within a disk array mirrors writes to a selected drive within the disk array. The mirror is light weight in that little effect on system performance is seen, since both writes need not be complete before the write is returned as successful. Upon subsequent failure of a drive within the array, the need for data regeneration is reduced or eliminated if the failed drive is the mirrored drive. The hot spare remains available for failure recovery when a different drive (other than the mirrored drive) fails, in which case conventional data regeneration techniques may be employed. When the mirrored drive fails, however, the period during which the disk array operates with diminished performance is reduced since data from the failed drive is available on the hot spare and regeneration is only required for data not completely mirrored. Even when a drive is arbitrarily selected within the array for mirroring, an overall reduction in the time required for data regeneration of failed disks will be seen in systems employing large numbers of arrays. Error information relating to the disk drives within the drive array and/or predictive failure analysis may be employed to increase the probability that the failed drive was mirrored. The prospect of complete data loss due to multiple drive failure is also reduced, since multiple drive failure is not fatal if one of the failed drives was mirrored.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
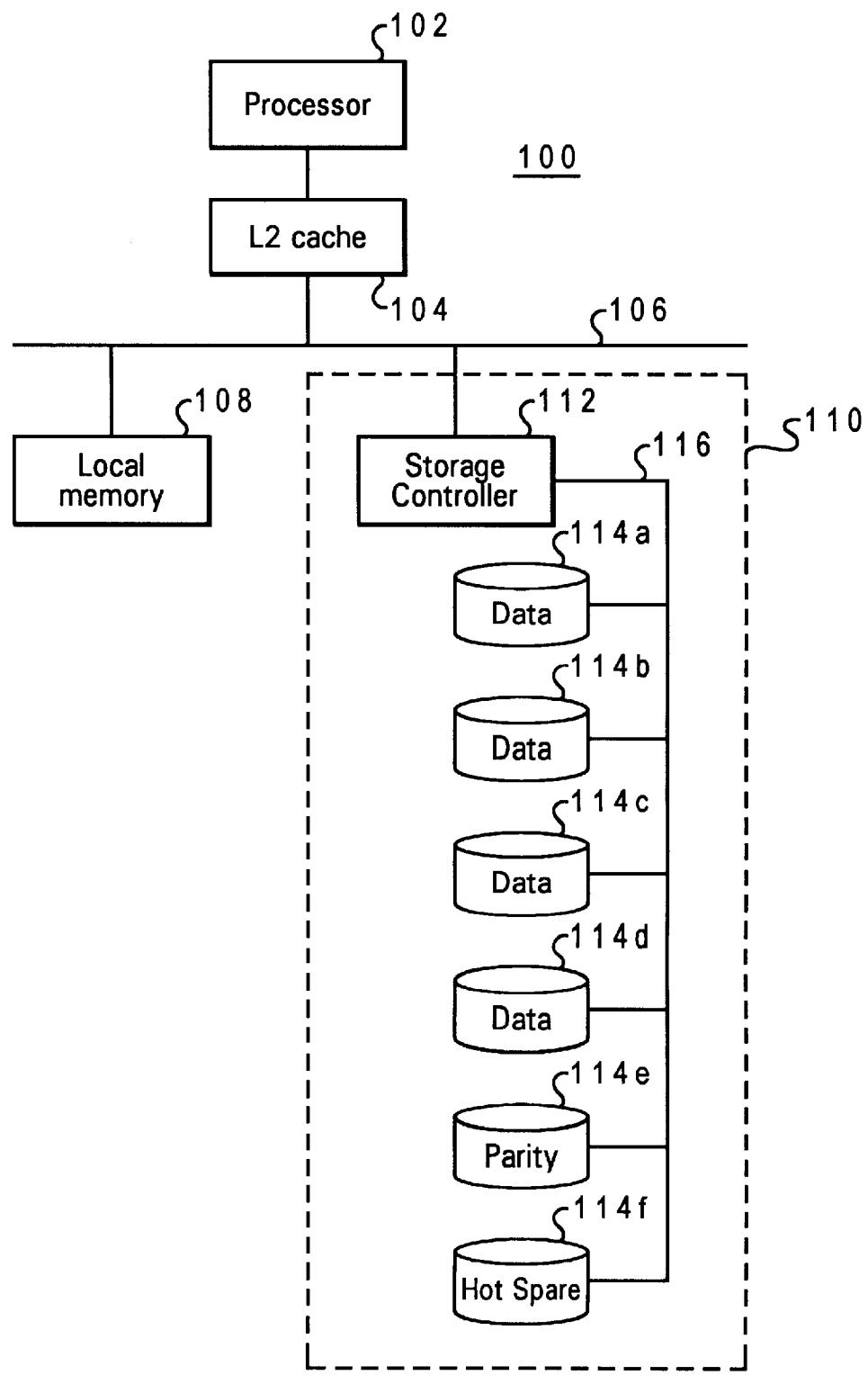
FIG. 1 depicts a data processing system including a disk array storage subsystem in which a preferred embodiment of the present invention may be implemented.

With reference now to the figures, and in particular with reference to FIG. 1, a data processing system including a disk array storage subsystem in which a preferred embodiment of the present invention may be implemented is depicted. Data processing system 100 includes a processor, which is preferably a member of the PowerPC™ family of processors available from International Business Machines Corporation of Armonk, N.Y.

In the exemplary embodiment, processor 102 is connected to a level two (L2) cache 104, which is connected in turn to system bus 106. Also connected to system bus 106 is local memory 108 and nonvolatile storage device 110. In addition, data processing system 100 may include other components not shown, such as input/output devices in the form of a keyboard, pointing device such as a mouse or trackball, and the like. The exemplary embodiment is provided solely for the purposes of describing and explaining the invention, and is not meant to imply architectural limitations.

In the present invention, nonvolatile storage device 110 is a RAID drive group or disk array. Disk array 110 includes a storage controller 112 controlling data transactions between the remainder of data processing system 100 and disk drives 114a–114f within disk array 110. Disk drives 114a–114f are coupled to storage controller 112 by internal bus 116. In accordance with the present invention, disk array 110 includes a plurality of data drives 114a–114d, at least one parity drive 114e, and at least one hot spare drive 114f.

The operation of disk array 100 in the exemplary embodiment generally conforms to well-known RAID specifications. The number of data drives and parity drives within disk drive 110 may vary, as may the particular data storage and/or failure recovery schemes employed by disk array 110. Thus, disk array 112 may include a larger or smaller number of data, parity, or data/parity drives than shown in the exemplary embodiment.

In accordance with the present invention, disk array 110 includes at least one hot spare drive 114f, and the functionality described below for selection and data mirroring of a selected drive among drives 114a–114e within disk array 110. The invention is also applicable, however, to data processing systems and storage subsystems which employ "global" hot spare drives in accordance with the known art. For example, within the Serial Storage Architecture of International Business Machines Corporation, a large number of devices (up to 127) may be connected to a single adapter and configured as a plurality of RAID groups, with only one drive serving as a "global" hot spare shared by all RAID groups. Hot spare drive 114f need not be dedicated to disk array 110, but must be accessible to disk array 110.

In the present invention, storage controller 112 mirrors (duplicates) writes to a selected drive within drives 114a–114e to hot spare drive 114f. The benefits achieved by the present invention are a inverse function of the number of drives sharing the hot spare. Therefore, although hot spare 114f need not be dedicated to disk array 110, better performance is achieved when hot spare 114f is dedicated to disk array 110 and fewer rather than more drives are included in disk array 110.

Contemporary magnetic disk drives, through integrated drive controller logic (not shown), collect a variety of error information relating to operation of the respective disk and store such error information in an accessible manner. Such information may be queried by storage controller 112 and employed to identify the drive among drives 114a–114e which is most likely to fail. Once identified, writes to that disk may be mirrored (duplicated) to hot spare drive 114f. Hot spare drive 114f remains available for conventional data regeneration in the event that a different disk than the one identified fails. However, if the mirrored disk within drives 114a–114e fails, data mirroring of the failed disk on hot spare drive 114f reduces—and possibly eliminates—the regeneration period by the presence of data from the failed disk on hot spare 114f.

Figure 2A:
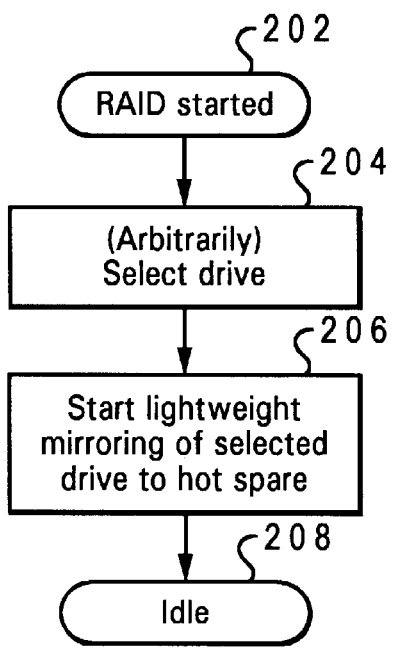
FIGS. 2A–2C are high level flowcharts for processes of data mirroring and failure recovery in accordance with a preferred embodiment of the present invention.
Figure 2B:
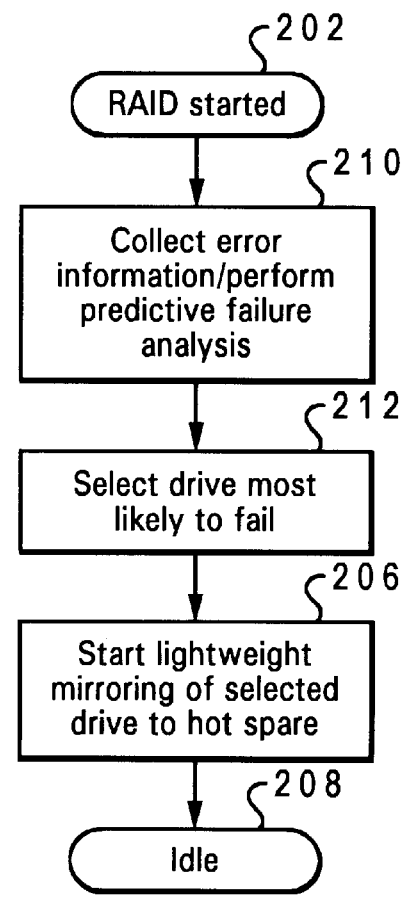
Figure 2C:
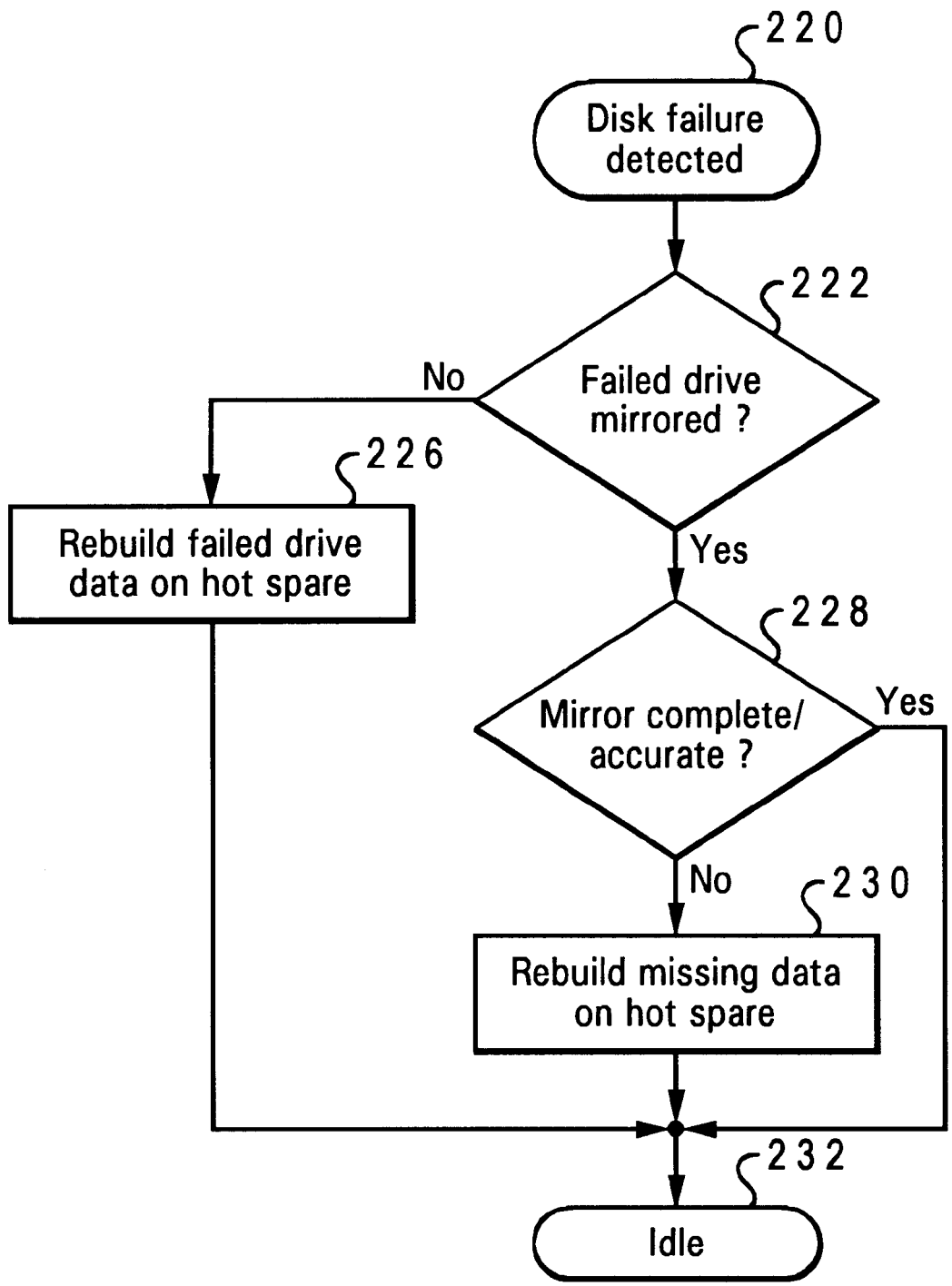

With reference now to FIGS. 2A through 2C, high level flowcharts for processes of data mirroring and failure recovery in accordance with a preferred embodiment of the present invention are illustrated. FIG. 2A illustrates a process for initiating data mirroring to a hot spare drive within the disk array. The process begins at step 202, which depicts a RAID drive array being started within a data processing system. The process then passes to step 204, which illustrates arbitrarily selecting a drive within the drive array, and then to step 206, which depicts starting lightweight mirroring of the selected drive to the hot spare. This mirroring of writes to the selected drive on the hot spare will continue indefinitely, until change is specified by an external process.

The mirroring of writes to the selected drive on the hot spare should be "light weight," or opportunistic. In conventional data mirrors, both write operations—the write operation to the primary storage and the write operation to the mirror—and the attendant bookkeeping must be completed before a controller may return an indication of success for the write operation. In a conventionally mirrored drive array, for example, data must be maintained within a storage controller buffer or a system device initiating the write operation until both write operations required for mirroring the data are complete, together with the necessary bookkeeping. If the primary storage should fail before the write to the mirror is complete, the mirror would not present an complete and accurate picture of data on the failed drive.

In the present invention, however, the data mirror on the hot spare need not be complete in order for benefits to be obtained when the mirrored drive fails. If the hot spare mirror does not contain a complete, accurate copy of the data on the failed drive, the uncopied data may be rebuilt. This requires much less time than rebuilding all of the data on the failed drive, and thus reduces the period during which the drive array operates with diminished performance. In general, the lightweight mirror will probably only be one write, at most, behind the failed drive and little time will be required to replicate the missing data. Thus, in the present invention, both write operations need not be complete before an indication of success may be returned. If the mirrored drive fails before the write operation to the hot spare completes, the data which was not successfully duplicated may be quickly and easily rebuilt. The closer the spare is to a complete and accurate mirror of the drive which failed, the less regeneration required. Because both write operations required for mirroring need not complete before an indication of success may be returned, however, the mirror is light weight, having virtually no impact on system performance.

From step 206, the process next passes to step 208, which illustrates the process becoming idle until another RAID device is started requiring initiation of lightweight mirroring in accordance with the present invention. Even though, in the exemplary embodiment of FIG. 2A, a drive was arbitrarily selected to be mirrored, benefits may be achieved in the event that a drive within the drive group fails. Within a drive array including N disk drives, there exists a 1 in N chance of the mirrored drive failing.

Particularly in data processing systems or networks which include a large number of drive arrays (more than 100) each having a lightweight mirror, this statistical probability of randomly selecting the drive which will fail first provides a benefit over time. If the correct drive was selected to be mirrored, the time for rebuilding data on the failed drive is eliminated or reduced to rebuilding the delta between the failed drive and the hot spare at the time of failure. If the correct drive was not selected for mirroring, the light weight mirror of the present invention has virtually no impact on performance.

FIG. 2B depicts an alternative process of initiating data mirroring to a hot spare drive within the disk array in accordance with the present invention. In this embodiment, the probability of correctly selecting the drive within a drive array which will first fail is increased by employing error information and/or predictive failure analysis on the drives within the drive array.

Contemporary magnetic disk drives collect a variety of error information relating to operation of the respective disk and store such error information in an accessible manner. One example is the Self-Monitoring, Analysis and Reporting Technology ("SMART") developed by International Business Machines Corporation, which derived from Predictive Failure Analysis ("PFA"), also developed by International Business Machines Corporation. Both technologies are known to those in the art through the patents and literature of International Business Machines Corporation of Armonk, N.Y.

SMART-capable drives, or drives employing PFA, typically employ periodic internal measurements of various magnetic parameters of the drive head and disk, as well as parameters of merit for the channel electronics, such as head fly height on all data surfaces, channel noise, signal coherence, signal amplitude, writing parameters, etc. These measurements provide direct detection of specific mechanisms which may precede a disk failure.

SMART-capable or PFA-enabled drives may, alternatively or concurrently, periodically analyze (generally during idle periods) the output of data, non-data, and motor start error recovery logs generated, for example by ECC circuitry on the hard drive card, or other logs of soft error rates. These histories are analyzed to detect thresholds indicative of impending failure.

The error information generated by SMART-capable or PFA-enabled disk drives may be queried by the storage controller for a drive array and employed to identify the drive within the drive array which is most likely to fail. Each drive within a disk array, including the hot spare, should be examined in turn before the start of lightweight mirroring in accordance with the invention. Preferably, the drive most likely to fail is selected to be mirrored to the hot spare, while the drive least likely to fail is selected as the hot spare/mirror, if possible.

Referring back to FIG. 2B, the process illustrated also starts with step 202, depicting a RAID device being started. The process then passes, however, to step 210, which illustrates collecting error information relating to the drives within the drive array and/or performing predictive failure analysis. The particular error information collected and/or employed in predictive failure analysis may depend on the circumstances, since some error statistics relating to disk drives correlate well with predicting failure, while others are less probative. One example of error information which might be employed to select a drive is the number of bad blocks within a drive. Magnetic disks are manufactured with a number of bad blocks or storage regions, typically below a threshold set by the manufacturer. The disk drive with the greatest number of bad blocks may be selected to be mirrored to the hot spare, which is likely to be no worse than arbitrarily selecting a drive but may be no better.

Better indicia of failure are available through predictive failure analysis, a process which generally serves to detect symptoms indicative of impending failure which are in the nature of gradual performance degradation rather than sudden, catastrophic failures. Different indicators may be utilized within predictive failure analysis, such as the temperature, the fly height of the read/write head above the disk surface, or seek errors, sector reassigns caused by bad sectors, and other errors recovered from the error log. Any or all of these indicators may be employed through predictive failure analysis to select a drive most likely to fail for mirroring. Similar error information may be utilized when available in various "SMART" disk drives conforming, for example, to the ANSI-standard SMART SCSI protocol promulgated by the SMART Working Group (SWG).

The process then passes to step 212, which depicts selected the drive within the disk array determined to be most likely to fail. The process passes next to step 206, which illustrates initiating lightweight mirroring of the selected drive on the hot spare, and then to step 208 which depicts the process becoming idle until another drive array is started. The error information or predictive failure analysis is not certain to identify the drive which will fail first. However, the better predictors which are employed to select a drive for mirroring, the more likely the drive array is to benefit from the light weight mirror of the present invention.

A further improvement to selecting a drive within the array to be mirrored, not addressed herein, would involve determining, based on error information monitored or predictive failure analysis performed during operation of a drive array, when to switch mirroring one drive within the array to another. Since predictive failure analysis is driven primarily by gradual performance degradation data, is may be preferable to allow a drive array to first operate with an arbitrarily selected lightweight mirroring for a selected period. This period may be arbitrarily chosen, or may be based on expected performance of the drives within the array—e.g., ½ or ⅓ of the lowest mean time between failure (MTBF) for drives in the array. The period should be long enough to allow useful information to be gathered for predictive failure analysis, but not so long as to present a risk of a predictable drive failure occurring before mirroring is initiated. Once the period has elapsed, predictive failure analysis may be performed on the drives, a drive most likely to fail selected, and lightweight mirroring switched to the drive most likely to fail by first copying all existing data on the selected drive to the hot spare and subsequently mirroring all writes to the presently-selected drive on the hot spare.

In systems having a global hot spare shared by several RAID groups or drive arrays, the error information should be gathered from all drives and the worst drive within any RAID group or drive array selected to be mirrored. Furthermore, in architectures which support hot plugging (e.g., SSA), error information should be gathered and predictive failure analysis performed to determine whether to recommend that a new drive be employed as a lightweight mirror rather than a new data drive (i.e., whether failure of an existing data drive is imminent).

FIG. 2C illustrates a process for handling drive failure in accordance with the present invention. This process is employed in conjunction with the processes of either FIG. 2A or 2B to obtain the benefits of light weight mirroring. The process begins at step 220, which depicts detection of a drive failure within the disk array. The process then passes to step 222, which illustrates a determination of whether the failed drive was the drive previously selected to be mirrored to the hot spare within the drive array. If not, the process proceeds to step 226, which illustrates rebuilding the data from the failed drive on the hot spare in accordance with the known art.

If the failed drive was previously selected for mirroring, the process proceeds instead to step 228, which illustrates a determination of whether the mirrored data on the hot spare was an accurate and complete duplicate of data on the failed drive. Such a determination may be made, for example based on whether a write operation to the hot spare was pending when the mirrored drive failed, or by employing the most recently written parity data to determine if the hot spare drive requires regeneration of some data. Contemporary drive architectures typically utilize "bookkeeping" data, such as the number of blocks of data sent to a drive array member and the receipt acknowledgements transmitted by drive array members, which may also be employed for this purpose.

If data regeneration is required, the process proceeds to step 230, which illustrates rebuilding the missing data, and then to step 232. If no data regeneration is required, however, the process proceeds instead directly to step 232, which illustrates the process becoming idle until another drive failure is detected. Once the failed drive is repaired or replaced, the process of FIG. 2A or 2B would again be performed to select a drive to be mirrored on the hot spare within the drive array, which may be the same drive or a different drive as was previously mirrored.

The present invention reduces the period during which a disk array provides diminished performance as a result of drive failure. The need for regeneration of data after failure, required by prior art systems, is reduced or eliminated altogether. Exposure to total data loss is also reduced, since multiple failures are not fatal if one of the failed drives was previously identified and mirrored to the hot spare drive. Data regeneration after a multiple failure in those circumstances remains feasible.

While the invention has been particularly shown and described with reference to a preferred embodiment, it will be understood by those skilled in the art that various changes in form and detail may be made therein without departing from the spirit and scope of the invention.

What is claimed is:

1. A method of improving failure recovery within a disk array, comprising:
    upon initiation within a data processing system of lightweight mirroring for a drive array including a plurality of data drives and a hot spare drive, selecting a data drive within the drive array and mirroring data write operations to the selected data drive on the hot spare drive until any data drive within the drive array fails; and
    responsive to subsequent failure of the selected data drive, employing the hot spare drive for data transactions to the drive array requiring data from the failed data drive.

2. The method of claim 1, further comprising:
    responsive to subsequent failure of a data drive within the array other than the selected data drive, rebuilding data from the other data drive on the hot spare drive.

3. The method of claim 1, wherein the step of selecting a data drive within the drive array further comprises:
    arbitrarily selecting a data drive within the drive array to be mirrored on the hot spare drive.

4. The method of claim 1, wherein the step of selecting a data drive within the drive array further comprises:
    selecting a data drive within the drive array which is most likely to fail to be mirrored on the hot spare drive.

5. The method of claim 1, wherein the step of selecting a data drive within the drive array further comprises:
    selecting a data drive to be mirrored on the hot spare drive utilizing predictive failure analysis.

6. The method of claim 1, wherein the step of mirroring data write operations to the selected data drive on the hot spare drive within the drive array further comprises:
    signaling a completion of write operations to the selected data drive which are mirrored to the hot spare drive before completion of a corresponding write operation to the hot spare drive.

7. The method of claim 1, further comprising:
    responsive to subsequent failure of the selected data drive, determining whether the hot spare drive contains a complete duplicate of data on the failed data drive; and
    responsive to determining that the hot spare drive does not contain a complete duplicate of the data on the failed data drive, rebuilding data from the failed data drive which is missing on the hot spare drive from parity information for the missing data.

8. A disk array, comprising:
    a drive array including a plurality of data drives and a hot spare drive; and
    a storage controller coupled to the drive array, wherein the storage controller:
        upon initiation of of lightweight mirroring for the drive array, selects a data drive within the plurality of data drives and mirrors data write operations to the selected data drive on the hot spare drive until any data drive within the drive array fails; and
        responsive to subsequent failure of the selected data drive, employs the hot spare drive for data transactions to the drive array requiring data from the failed data drive.

9. The disk array of claim 8, wherein the storage controller, responsive to subsequent failure of a data drive within the plurality of data drives other than the selected data drive, rebuilds data from the other data drive on the hot spare drive.

10. The disk array of claim 8, wherein the selected data drive selected to be mirrored on the hot spare drive is arbitrarily selected from the plurality of data drives.

11. The disk array of claim 8, wherein the selected data drive selected to be mirrored on the hot spare drive is a data drive within the plurality of data drives which is most likely to fail.

12. The disk array of claim 8, wherein the selected data drive selected to be mirrored on the hot spare drive is a data drive within the drive array selected utilizing predictive failure analysis.

13. The disk array of claim 8, wherein the storage controller signals a completion of write operations to the selected data drive which are mirrored to the hot spare drive before completion of a corresponding write operation to the hot spare drive.

14. The disk array of claim 8, wherein the storage controller,
    responsive to failure of the selected data drive, determines whether the hot spare drive contains a complete duplicate of data on the failed data drive; and
    responsive to determining that the hot spare drive does not contain a complete duplicate of the failed data drive, rebuilds data from the failed data drive which is missing on the hot spare drive.

15. A method of improving drive array failure recovery, comprising:

upon initiation of lightweight mirroring for a drive array including a plurality of data drives and a hot spare drive, selecting a data drive within the drive array which is most likely to fail;

mirroring data write operations to the selected data drive on the hot spare drive until any data drive within the drive array fails;

responsive to failure of a data drive within the drive array, determining whether the failed data drive was the selected data drive mirrored on the hot spare drive;

responsive to determining that the failed data drive was the selected data drive mirrored on the hot spare drive, employing the hot spare drive for data transactions to the drive array requiring data from the failed data drive; and responsive to determining that the failed data drive was not the selected data drive mirrored on the hot spare drive, regenerating data from the failed data drive on the hot spare drive.

16. The method of claim 15, further comprising:

after regenerating data from the failed data drive on the hot spare drive, employing the hot spare drive for data transactions to the drive array requiring data from the failed data drive.

17. The method of claim 15, wherein the step of determining whether the failed data drive was the selected data drive mirrored on the hot spare drive further comprises:

determining whether the hot spare drive contains a complete duplicate of data on the failed data drive; and responsive to determining that the hot spare drive does not contain a complete duplicate of data on the failed data drive, regenerating data on the failed data drive which is missing from the hot spare drive on the hot spare drive.

18. The method of claim 17, wherein the step of regenerating data on the failed data drive which is missing from the hot spare drive on the hot spare drive further comprises:

regenerating the missing data utilizing parity information regarding the missing data.

19. The method of claim 15, wherein the step of selecting a data drive within a drive array which is most likely to fail further comprises:

selecting a data drive utilizing predictive failure analysis.

20. The method of claim 15, wherein the step of mirroring data write operations to the selected data drive on a hot spare drive within the drive array further comprises:

duplicating write operations for the selected data drive to the hot spare drive; and upon completion of write operations to the selected data drive, returning a completion indicator prior to completion of corresponding write operations to the hot spare drive.

* * * * *